United States Patent
Rohee et al.

(10) Patent No.: US 9,369,467 B1
(45) Date of Patent: Jun. 14, 2016

(54) SYSTEM, METHOD, AND COMPUTER PROGRAM FOR PROVIDING GENERIC ACCESS TO WEB CONTENT ON A MOBILE DEVICE

(71) Applicant: Amdocs Software Systems Limited, Dublin (IE)

(72) Inventors: Emmanuel Rohee, Saint Sulpice la Foret (FR); Pierre-Erwann Gouesbet, Longaulnay (FR); Cedric Gegout, Rennes (FR)

(73) Assignee: Amdocs Software Systems Limited, Dublin (IE)

( * ) Notice: Subject to any disclaimer, the term of this patent is extended or adjusted under 35 U.S.C. 154(b) by 93 days.

(21) Appl. No.: 14/272,351

(22) Filed: May 7, 2014

Related U.S. Application Data

(60) Provisional application No. 61/820,722, filed on May 8, 2013.

(51) Int. Cl.
  G06F 15/16 (2006.01)
  H04L 29/06 (2006.01)
  G06F 21/30 (2013.01)

(52) U.S. Cl.
  CPC ............... *H04L 63/10* (2013.01); *G06F 21/30* (2013.01)

(58) Field of Classification Search
  CPC .......... G06F 21/30; H04L 63/00; H04L 63/10
  See application file for complete search history.

(56) References Cited

U.S. PATENT DOCUMENTS

| | | | | |
|---|---|---|---|---|
| 6,615,212 B1* | 9/2003 | Dutta | ................ | G06F 17/30569 |
| 7,013,469 B2* | 3/2006 | Smith | ..................... | G06F 9/465 |
| | | | | 719/315 |
| 7,251,780 B2* | 7/2007 | Cheng | ............... | G06F 17/30905 |
| | | | | 707/E17.121 |
| 7,546,576 B2* | 6/2009 | Egli | ........................ | H04L 29/06 |
| | | | | 715/239 |
| 8,055,913 B2* | 11/2011 | Ginter | ..................... | G06F 21/10 |
| | | | | 705/51 |
| 8,959,650 B1* | 2/2015 | Richards | ................. | G06F 21/44 |
| | | | | 709/227 |
| 2003/0074418 A1* | 4/2003 | Coker | ..................... | G06F 9/547 |
| | | | | 709/217 |
| 2004/0166878 A1* | 8/2004 | Erskine | ................. | H04W 48/04 |
| | | | | 455/456.1 |
| 2005/0240827 A1* | 10/2005 | Sankaran | ............ | G06F 17/3089 |
| | | | | 714/43 |
| 2006/0230272 A1* | 10/2006 | Lawrence | ............... | H04L 67/02 |
| | | | | 713/176 |
| 2007/0220261 A1* | 9/2007 | Farrugia | .................. | G06F 21/64 |
| | | | | 713/176 |
| 2007/0250711 A1* | 10/2007 | Storey | ................... | H04W 12/06 |
| | | | | 713/168 |
| 2009/0070413 A1* | 3/2009 | Priyadarshan | ...... | G06F 17/2247 |
| | | | | 709/203 |
| 2009/0132718 A1* | 5/2009 | Groll | ..................... | H04W 12/08 |
| | | | | 709/229 |

(Continued)

FOREIGN PATENT DOCUMENTS

CN 101635622 A * 1/2010 .......... H04L 63/0428

*Primary Examiner* — Kaveh Abrishamkar
*Assistant Examiner* — James J Wilcox
(74) *Attorney, Agent, or Firm* — Zilka-Kotab, PC

(57) ABSTRACT

A system, method, and computer program product are provided for providing generic access to web content on a mobile device. In use, a request for requested web content is received from a web runtime component associated with a mobile device, the requested web content corresponding to a particular user of the mobile device. Additionally, it is determined whether the particular user is permitted to access the requested web content. Further, the requested web content is retrieved from one or more network based servers associated with the requested web content, in response to determining that the particular user is permitted to access the requested web content. In addition, one or more instructions for modifying the retrieved requested web content are executed, thereby generating modified web content. Furthermore, the modified web content is sent to the web runtime component for rendering.

16 Claims, 5 Drawing Sheets

(56) References Cited

U.S. PATENT DOCUMENTS

| | | | |
|---|---|---|---|
| 2009/0282474 A1* | 11/2009 | Chen | G06F 21/53 726/21 |
| 2010/0042424 A1* | 2/2010 | Turakhia | G06Q 10/107 705/14.54 |
| 2010/0281107 A1 | 11/2010 | Fallows et al. | |
| 2011/0040691 A1* | 2/2011 | Martinez | G06Q 20/3224 705/80 |
| 2012/0226813 A1* | 9/2012 | Ragusa | G06F 9/5027 709/227 |
| 2012/0246557 A1* | 9/2012 | Venugopal | H04L 67/2823 715/234 |
| 2013/0104208 A1* | 4/2013 | Kumar | H04W 12/06 726/7 |
| 2013/0227078 A1* | 8/2013 | Wei | H04L 67/02 709/219 |
| 2015/0089354 A1* | 3/2015 | Abrahami | G06F 17/3089 715/235 |

\* cited by examiner

SYSTEM, METHOD, AND COMPUTER PROGRAM FOR PROVIDING GENERIC ACCESS TO WEB CONTENT ON A MOBILE DEVICE

CLAIM OF PRIORITY

This application claims the benefit of U.S. Provisional Application No. 61/820,722, filed May 8, 2013, the entire contents of which are incorporated herein by reference.

FIELD OF THE INVENTION

The present invention relates generally to mobile web applications, which are applications developed for mobile devices, and are typically based on standard web technologies (e.g. HTML5, etc.).

BACKGROUND

The HITML5-hybrid paradigm includes using a web-to-native abstraction layer enabling access to device capabilities that are not accessible in pure mobile web applications, such as an accelerometer, a camera, and local storage. The HTML5-hybrid approach suffers from technical limitations due to the web ecosystem, and specifically regarding how content from different sources can be aggregated and used as inputs in a single mobile application.

There is thus a need for addressing these and/or other issues associated with the prior art,

SUMMARY

A system, method, and computer program product are provided for providing generic access to web content on a mobile device. In use, a request for requested web content is received from a web runtime component associated with a mobile device, the requested web content corresponding to a particular user of the mobile device. Additionally, it is determined whether the particular user is permitted to access the requested web content. Further, the requested web content is retrieved from one or more network based servers associated with the requested web content, in response to determining that the particular user is permitted to access the requested web content. In addition, one or more instructions for modifying the retrieved requested web content are executed, thereby generating modified web content. Furthermore, the modified web content is sent to the web runtime component for rendering.

DETAILED DESCRIPTION

Figure 1:
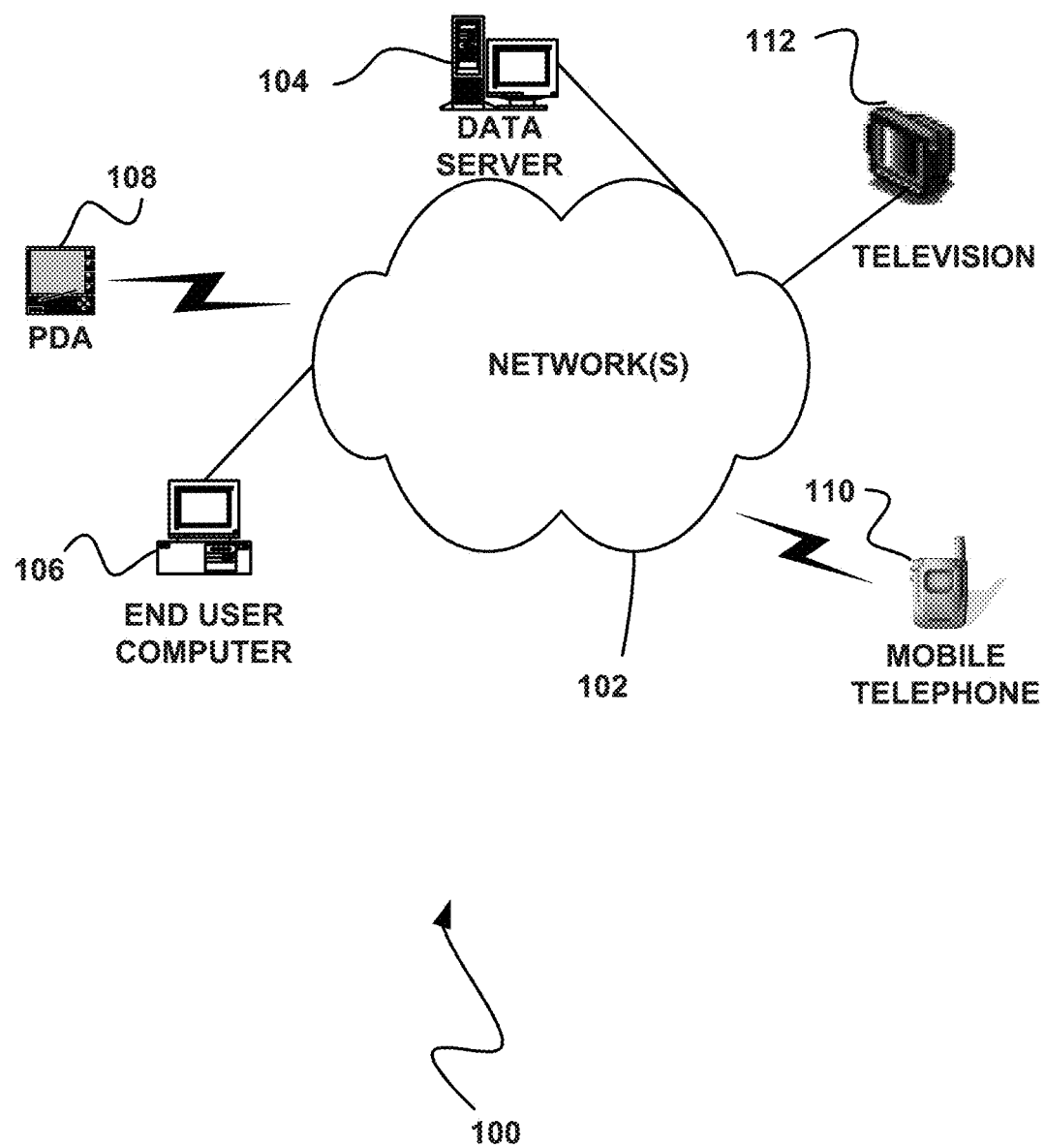
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
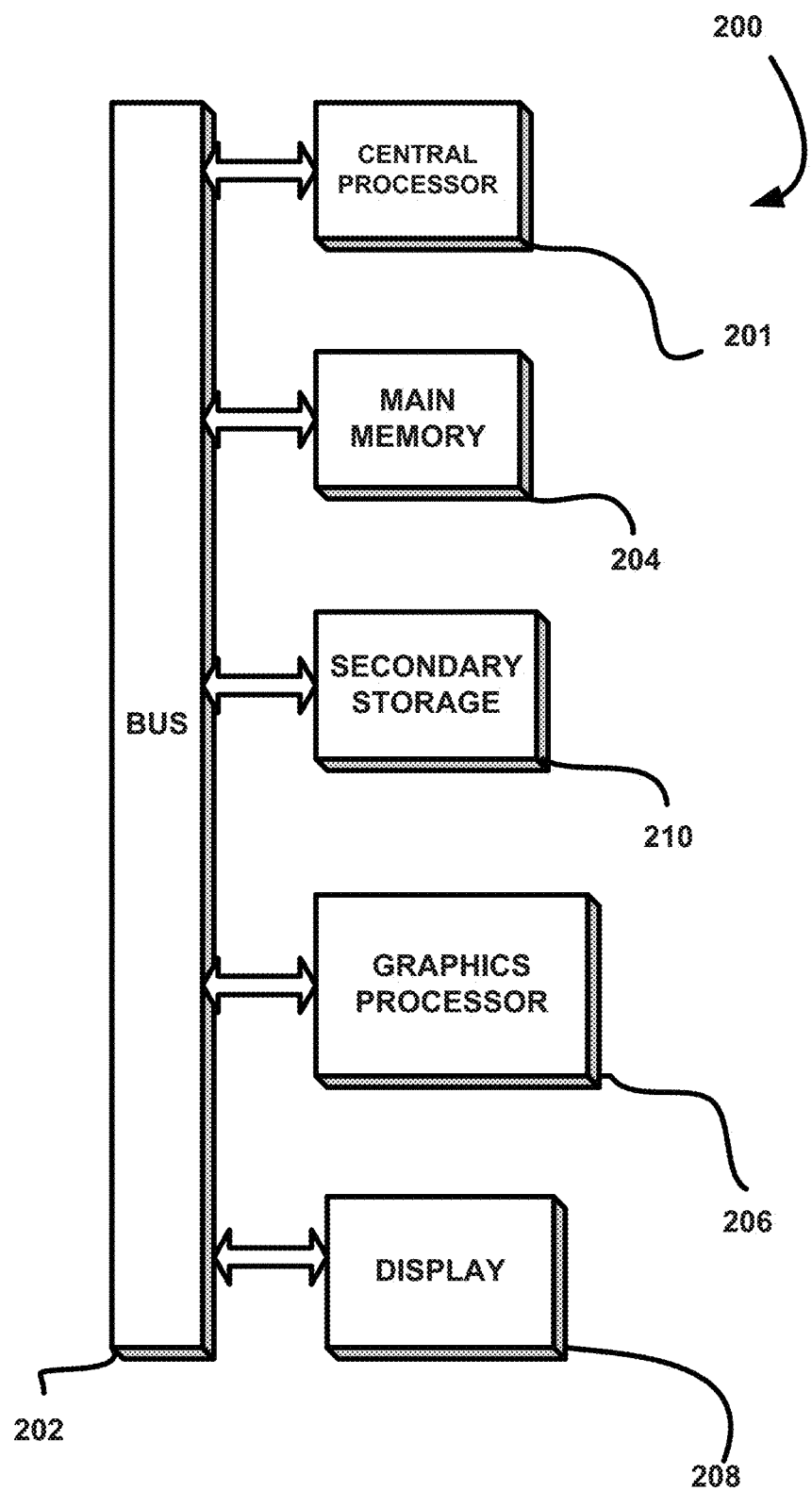
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
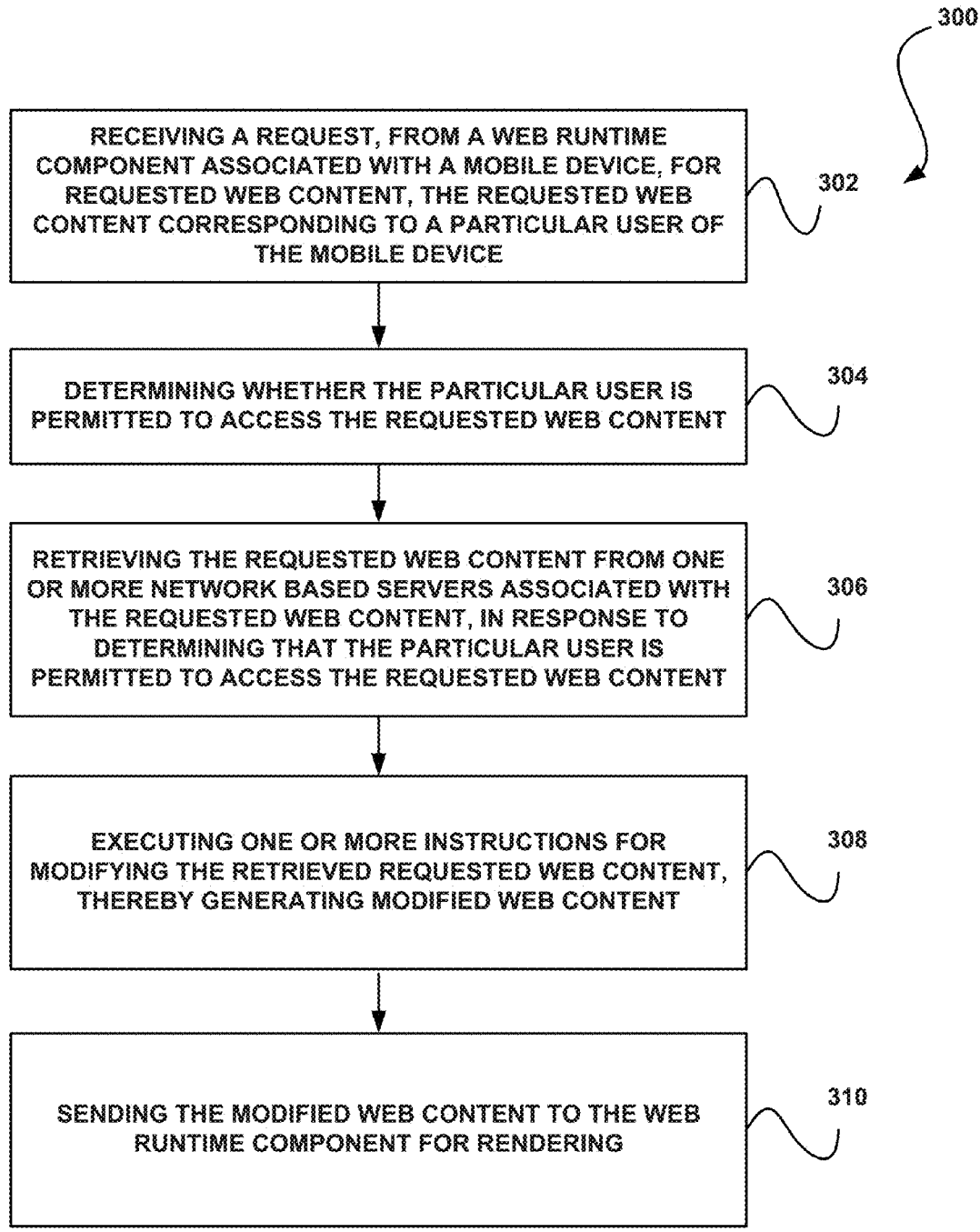
FIG. 3 illustrates a method for providing generic access to web content on a mobile device, in accordance with one embodiment.

FIG. 3 illustrates a method 300 for providing generic access to web content on a mobile device, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a request for requested web content is received from a web runtime (WRT) component associated with a mobile device, the requested web content corresponding to a particular user of the mobile device. See operation 302. In one embodiment, the request may include an HTTP request.

Further, the mobile device may include any mobile device capable of accessing web content. For example, in various embodiments, the mobile device may include a mobile phone, a tablet computer, a laptop computer, and/or any other computing device.

In one embodiment, the request may be received by a local web server component associated with the mobile device. In the context of the present description, the local web server component refers to a component (e.g. computer code and/or hardware components, etc.) capable of delivering content to the web runtime component and functioning as a non-transparent proxy, fully configurable by computer programming code (e.g. JavaScript codes, etc.).

As shown further in FIG. 3, it is determined whether the particular user is permitted to access the requested web content. See operation 304. For example, in one embodiment, a content compliancy verification request may be received.

In this case, the content compliancy verification request may function to initiate the determination of whether the particular user is permitted to access the requested web content. In one embodiment, the content compliancy verification request may be sent from the web runtime component to a content validation component (e.g. a "profiler," etc.) associated with the mobile device.

Accordingly, in one embodiment, determining whether the particular user is permitted to access the requested web content may include determining whether the requested content is compliant with user permissions associated with the particular user.

As an example, the user permissions may be associated with a white list and/or a black list, etc.

In response to determining that the requested content is compliant with user permissions associated with the particular user, in one embodiment, a native application programming interface (API) associated with the web runtime component may be executed. Additionally, a specific session token that corresponds to the request for the requested web content may be set.

In this case, the request for the requested web content may include an HTTP request including the specific session token and the request may be received by the local web server component associated with the mobile device, In response, the web server component may verify with the content validation component that the specific session token is valid. Moreover, the local web server component may retrieve user profile parameters associated with the particular user from the content validation component.

With further reference to FIG. 3, the requested web content is retrieved from one or more network based servers associated with the requested web content, in response to determining that the particular user is permitted to access the requested web content. See operation 306. The requested web content may be retrieved from any servers and/or databases associated with the requested web content (e.g. over the Internet, etc.).

In addition, one or more instructions for modifying the retrieved requested web content are executed, thereby generating modified web content. See operation 308. The instructions for modifying the retrieved requested web content may include any instructions or rules for formatting, adapting, parsing, and/or in any other way modifying the requested web content.

For example, in one embodiment, the instructions for modifying the retrieved requested web content may include one or more content adaptation rules. As an example, the content adaptation rules may include a rule or rules for removing elements from the requested web content, adding elements to the requested web content, and/or modifying portions of elements of the requested web content. As another example, the content adaptation rules may include a rule or rules for removing advertisements from the requested web content or adding advertisements to the requested web content.

In another embodiment, the instructions for modifying the retrieved requested web content may include one or more transcoding instructions. In this case, the transcoding instructions may include instructions for converting data of the requested content from a first format to a second format (such as from XML to JSON, etc.).

In another embodiment, the instructions for modifying the retrieved requested web content may include one or more rules for caching the requested content or the modified content. As another example, instructions for modifying the retrieved requested web content may include one or more integrity verification rules for verifying an integrity and an origin of the requested content. In another embodiment, the instructions for modifying the retrieved requested web content may include one or more decryption rules for decrypting the requested content.

As shown further in FIG. 3, the modified web content is sent to the web runtime component for rendering. See operation 310. Thus, the modified web content may be rendered for the particular user of the mobile device thereby providing generic access to web content on the mobile device.

Utilizing this technique, a system may function to overcome limitations of the web runtime (WRT) when working with external content sources (such as Cross-Origin Resource Sharing limitations specified in W3C/HTML5 standard) and may function to implement content mashups in applications (for instance when the local web server retrieves content from different external web servers). This technique also allows a system to manage client-server independent code with any remote content source adapting the code (thanks to the code executed by the local web server) for rendering into the application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
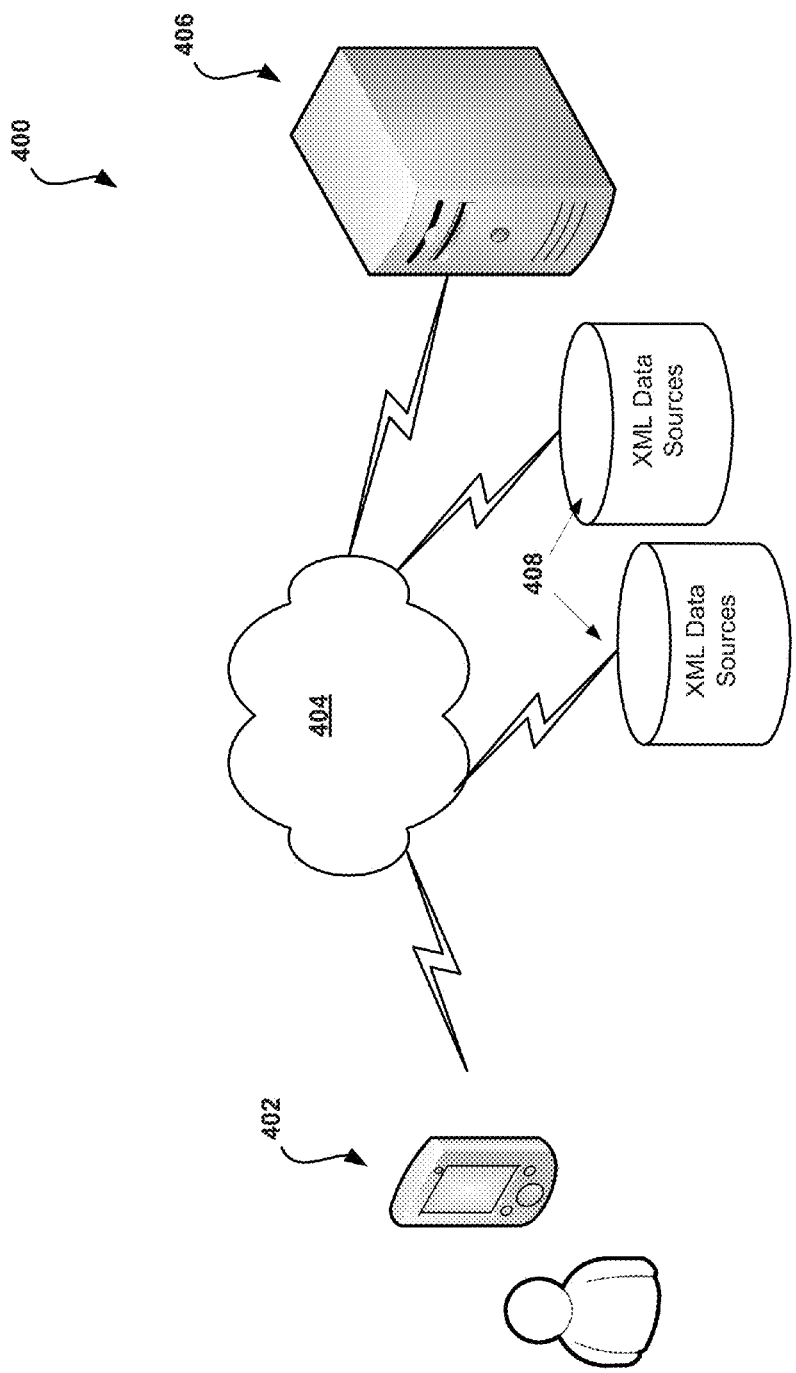
FIG. 4 illustrates a system for providing generic access to web content on a mobile device, in accordance with one embodiment.

FIG. 4 illustrates a system 400 for providing generic access to web content on a mobile device, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes one or more mobile devices 402 that have access to one or more databases 408, and/or one or more servers 406 over a network 404. In operation, the components associated with the mobile device 402 may function to provide generic access to web content on the mobile device 402. In one embodiment, the databases 408 are used by the local web server to obtain HTML content independent data, content adaptation rules or adaptation programmatic codes. 406 represents the web servers where the web content should be retrieved from.

Developing mobile HITML5 applications with native capabilities is a relatively new domain and is undergoing frequent innovation and improvements. Typical mobile web applications are composed of web content embedded on a mobile device and remote Web/XML/JSON content received from servers.

In one embodiment, components associated with the mobile device 402 may function to allow decoupling a mobile application from a content access policy entity. These components may be referred to collectively as the content access entity.

In one embodiment, the content access entity may be divided into two modules. The first module or component, referred to as a profiler or content validation component, is in charge of checking the access policy. The profiler may implement specific and complex logic for accessing and proxying content.

The second module performs the content retrieval, works as a proxy, and may adapt the content for aggregation into the mobile application. In one embodiment, none of this logic may be executed in the web runtime component and therefore the logic need not comply with the web runtime component operations, which is dictated by the W3C mobile standard and any device vendor restrictions, and thus suffer from its limitations.

This logic may thus be written in device-independent code such as, for example, JavaScript, Java, Ruby, and Python, etc. This code may be executed on servers such as NodeJS or Rhino, etc. This technique allows JavaScript components to be executed either on the client or the server without any modifications.

Figure 5:
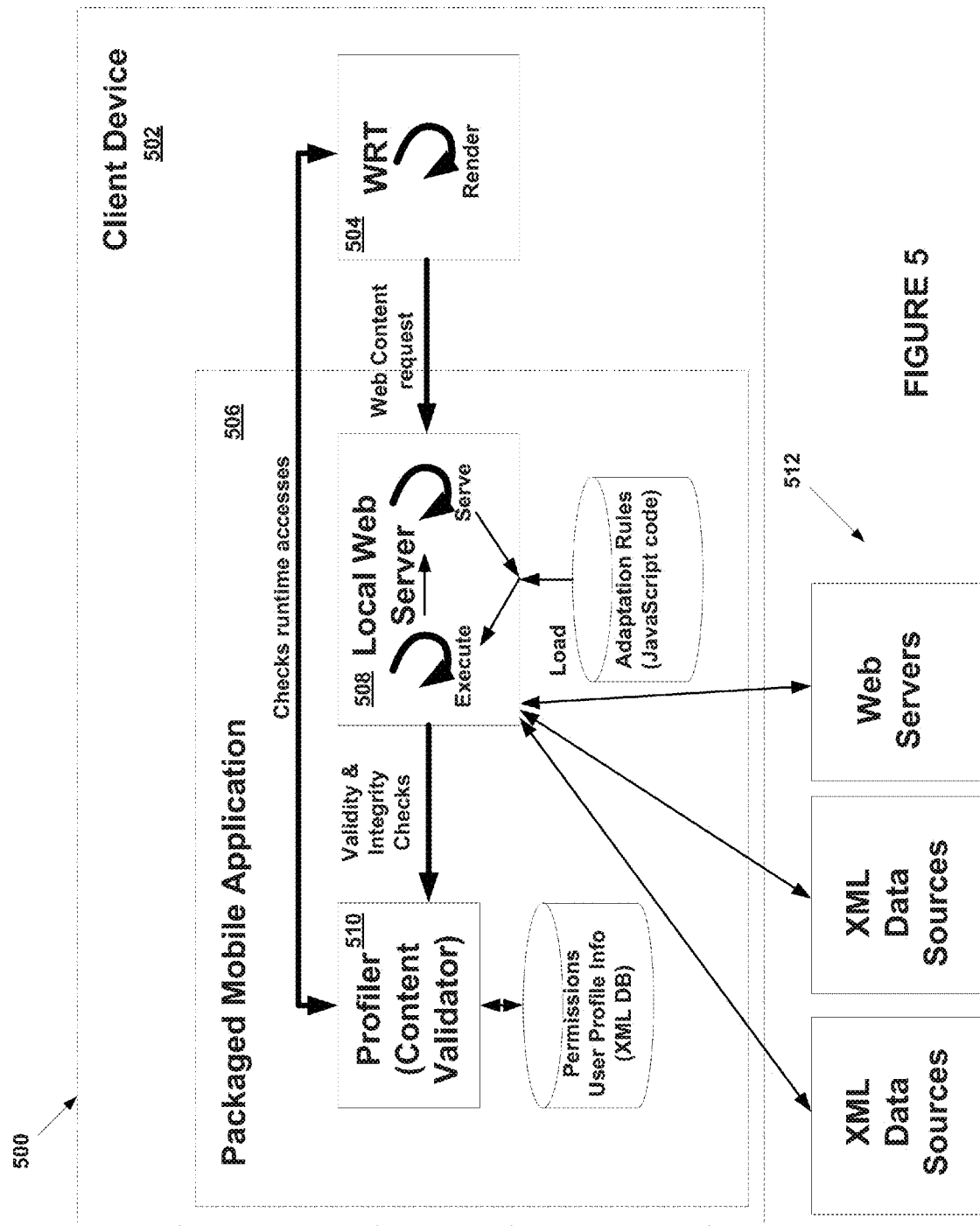
FIG. 5 illustrates a system for providing generic access to web content on a mobile device, in accordance with one embodiment.

FIG. 5 illustrates a system 500 for providing generic access to web content on a mobile device, in accordance with one embodiment. As an option, the system 500 may be implemented in the context of the details of FIGS. 1-4. Of course, however, the system 500 may be implemented in the context of any desired environment. Further, the aforementioned definitions may equally apply to the description below.

In operation, the system 500 uses a client-side execution environment running on a mobile device 502, which may load and run mobile HTML5 application code. The system 500 allows retrieving web content from any HTTP data sources, to modify it and to transfer the modified content to a web runtime component 504 as regular content coming from any HTTP source.

As shown, the system 500 includes a mobile application 506 that includes a local web server component 508, which delivers content to the web runtime component 504 and acts as a non-transparent proxy fully configurable by JavaScript codes.

Additionally, the mobile application 506 includes a content validator 510, referred to as a profiler, that executes permissions and filtering based on user profile rules. Still yet, the system 500 includes the web runtime component 504 that executes, in memory, web content composed of, for example, HTML pages, JS libraries, CSS pages or instructions and media.

In operation, the web runtime component 504 triggers the retrieval of the bootstrap HTML content via, for example, a URL or a local file. A request is then sent to the profiler 510 for content compliancy checking. The profiler 510 checks that the content is compliant with the user permissions as detailed, for example, in white lists and black lists, and implements a native API with the web runtime component 504 that functions to set a specific session token which corresponds to this first request.

The local web server 508 receives the HTML content request as an HTTP request, referred to as the original content (OCT) or requested content. The local web server 508 verifies with the profiler 510 that the session token included in the HTTP request is valid, and retrieves user profile parameters (UPP) from the profiler 510.

The local web server 508 reads the version of the content from external servers 512, executes the JavaScript script code, referred to as the "adaptation rules code" (ARC) or modification instructions, which function to parse and adapt this content. The local web server 508 then delivers the adapted content (ACT) to the web runtime component 504.

Lastly, the web runtime component 504 renders the adapted content for the end-users. Some HTTP hyperlinks may be activated from the adapted content, and the process may repeat for each activated hyperlink.

In another embodiment, the profiler 510 may just accept requests. In this case, the profiler 510 may then process the requests outside of a user context, and the UPP data will be empty.

When developing hybrid applications, the developer is able to separate the JavaScript code used for the modification instructions (e.g. the ARC, etc.) and executed by the local web server 508, and the HTML content in the embedded web content executed by the web runtime component 504 (OCT and ACT).

The modification instructions (e.g. the ARC) may be associated with a variety of tasks. For example, the modification instructions may be associated with content adaptation. For example, the code may cause element removal for advertisements, filtering, or enrichments by using data from different sources and based on UPP data.

As another example, the code may cause transcoding. For example, the code may modify a payload from one data source of one format to another, such as from XML to JSON, without impacting either the data source or the mobile application embedded content.

As another example, the code may cause content caching. For example, the code may instruct caching of the content to ensure that it is still available offline.

As another example, the code may implement content control functionality. For example, the code may be used to return default content instead of the exact content if the latter is from a forbidden web source.

As another example, the code may implement integrity verification. For example, using a signature mechanism, the code may verify the integrity and origin of the content (e.g. the OCT).

Further, the code may function to implement decryption. For example, the code may decrypt the content if it was encrypted by a server for protecting it to any men-in-the-middle attack, such as an agent listening to the HTTP socket.

In one embodiment, the modification instruction code may already be installed with the application 506 and may not need to be downloaded from any remote source. In another embodiment, the modification instruction code may be downloaded at the time of the request and the location from where modification instruction code is retrieved may depend on the HTTP request used to retrieve the content.

While various embodiments have been described above, it should be understood that they have been presented by way of example only, and not limitation.

Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving a request, from a web runtime component associated with a mobile device, for requested web content, the requested web content corresponding to a particular user of the mobile device;
   computer code for receiving a content compliancy verification request sent from the web runtime component to a content validation component associated with the mobile device, the content compliancy verification request functioning to initiate determining whether the particular user is permitted to access the requested web content including determining whether the requested web content is compliant with user permissions associated with the particular user;
   computer code for executing a native application programming interface (API) associated with the web runtime component, in response to determining that the requested web content is compliant with user permissions associated with the particular user;

computer code for retrieving the requested web content from one or more network based servers associated with the requested web content, in response to determining that the particular user is permitted to access the requested web content;

computer code for executing one or more instructions for modifying the retrieved requested web content, thereby generating modified web content; and computer code for sending the modified web content to the web runtime component for rendering.

2. The computer program product of claim 1, wherein the computer program product is operable such that the user permissions are associated with at least one of a white list or a black list.

3. The computer program product of claim 1, further comprising computer code for setting a specific session token that corresponds to the request for the requested web content.

4. The computer program product of claim 3, wherein the computer program product is operable such that the request for the requested web content includes an HTTP request including the specific session token and the request is received by a web server component associated with the mobile device.

5. The computer program product of claim 4, further comprising computer code for verifying, with the content validation component, that the specific session token is valid.

6. The computer program product of claim 5, wherein the computer program product is operable such that the web server component associated with the mobile device retrieves user profile parameters associated with the particular user from the content validation component.

7. The computer program product of claim 1, wherein the computer program product is operable such that the one or more instructions for modifying the retrieved requested web content include one or more content adaptation rules.

8. The computer program product of claim 7, wherein the computer program product is operable such that the content adaptation rules include at least one of:
  a rule for removing elements from the requested web content;
  a rule for adding elements to the requested web content; and
  a rule for modifying some element parts of the requested web content.

9. The computer program product of claim 7, wherein the computer program product is operable such that the content adaptation rules include at least one rule for removing advertisements from the requested web content or adding advertisements to the requested web content.

10. The computer program product of claim 1, wherein the computer program product is operable such that the one or more instructions for modifying the retrieved requested web content include one or more transcoding instructions.

11. The computer program product of claim 10, wherein the computer program product is operable such that the one or more transcoding instructions include instructions for converting data of the requested web content from a first format to a second format.

12. The computer program product of claim 1, wherein the computer program product is operable such that the one or more instructions for modifying the retrieved requested web content include one or more rules for caching the requested web content or the modified web content.

13. The computer program product of claim 1, wherein the computer program product is operable such that the one or more instructions for modifying the retrieved requested web content include one or more integrity verification rules for verifying an integrity and an origin of the requested web content.

14. The computer program product of claim 1, wherein the computer program product is operable such that the one or more instructions for modifying the retrieved requested web content include one or more decryption rules for decrypting the requested web content.

15. A method, comprising:
  receiving a request, from a web runtime component associated with a mobile device, for requested web content, the requested web content corresponding to a particular user of the mobile device;
  receiving a content compliancy verification request sent from the web runtime component to a content validation component associated with the mobile device, the content compliancy verification request functioning to initiate determining whether the particular user is permitted to access the requested web content including determining whether the requested web content is compliant with user permissions associated with the particular user;
  executing a native application programming interface (API) associated with the web runtime component, in response to determining that the requested web content is compliant with user permissions associated with the particular user;
  retrieving the requested web content from one or more network based servers associated with the requested web content, in response to determining that the particular user is permitted to access the requested web content;
  executing one or more instructions for modifying the retrieved requested web content, thereby generating modified web content; and
  sending the modified web content to the web runtime component for rendering.

16. A system comprising:
  a memory system; and
  one or more processing cores coupled to the memory system and that are each configured to:
  receive a request, from a web runtime component associated with a mobile device, for requested web content, the requested web content corresponding to a particular user of the mobile device;
  receive a content compliancy verification request sent from the web runtime component to a content validation component associated with the mobile device, the content compliancy verification request functioning to initiate determine whether the particular user is permitted to access the requested web content including determining whether the requested web content is compliant with user permissions associated with the particular user;
  execute a native application programming interface (API) associated with the web runtime component, in response to determining that the requested web content is compliant with user permissions associated with the particular user;
  retrieve the requested web content from one or more network based servers associated with the requested web content, in response to determining that the particular user is permitted to access the requested web content;
  execute one or more instructions for modifying the retrieved requested web content, thereby generating modified web content; and send the modified web content to the web runtime component for rendering.

\* \* \* \* \*